(12) United States Patent
Shafir

(10) Patent No.: US 7,075,434 B2
(45) Date of Patent: Jul. 11, 2006

(54) ENCODING AND DECODING METHOD AND SYSTEM

(76) Inventor: Michael Shafir, 21 Bar-Lev Street, Kiryal Ono 55000 (IL)

( * ) Notice: Subject to any disclaimer, the term of this patent is extended or adjusted under 35 U.S.C. 154(b) by 0 days.

(21) Appl. No.: 10/665,214

(22) Filed: Sep. 22, 2003

(65) Prior Publication Data

US 2005/0073415 A1    Apr. 7, 2005

(51) Int. Cl.
*G08B 13/14* (2006.01)
(52) U.S. Cl. .................. 340/571; 340/572.1; 235/435; 341/54
(58) Field of Classification Search .............. 340/571, 340/572.1, 568.1; 235/435, 491; 341/52, 341/54, 62, 63
See application file for complete search history.

(56) References Cited

U.S. PATENT DOCUMENTS

| | | | | |
|---|---|---|---|---|
| 5,218,189 A | * | 6/1993 | Hutchison | 235/439 |
| 5,241,160 A | | 8/1993 | Bashan et al. | |
| 5,341,099 A | | 8/1994 | Suzuki | 324/309 |
| 5,381,137 A | | 1/1995 | Ghaem et al. | 340/572.5 |
| 5,444,223 A | * | 8/1995 | Blama | 235/435 |
| RE37,956 E | | 1/2003 | Blama | |
| 6,611,798 B1 | | 8/2003 | Bruhn et al. | 704/219 |
| 6,669,094 B1 | | 12/2003 | Hodges | 235/486 |
| 6,714,120 B1 | * | 3/2004 | Blama et al. | 340/10.1 |
| 6,775,323 B1 | * | 8/2004 | Vasudevan Pillai et al. | 375/238 |

FOREIGN PATENT DOCUMENTS

DE        100 52 689        5/2002

* cited by examiner

*Primary Examiner*—Toan N. Pham

(57) ABSTRACT

In a method and apparatus for encoding a tag with an n-bit binary code one or more predetermined frequency sources are associated with the tag that produce known different respective characteristic frequencies, each of which is associated with a known unique position in the n-bit binary code.

25 Claims, 7 Drawing Sheets

ENCODING AND DECODING METHOD AND SYSTEM

FIELD OF THE INVENTION

This invention relates to a method and system for encoding and decoding the identification of a tag.

BACKGROUND OF THE INVENTION

Automatic identification may be effected in different ways including many bar codes, identification tags and may be used to identify articles and personnel.

Radio Frequency Identification (RFID) is an automatic identification technology similar in application to bar code technology, but uses radio frequency instead of optical signals. An RFID system consists of two major components—a reader and a tag or card. They work together to provide the end user with a non-contact solution to uniquely identify people, animals or objects. The reader performs several functions, one of which is to produce a low-level radio frequency magnetic field that serves as a "carrier" of power from the reader to the RFID tag.

A passive RFID tag contains an antenna and an integrated circuit (IC). The IC requires only a minimal amount of electrical power to function. The antenna in the tag provides a means for gathering the energy present in the magnetic field produced by the reader, and converts it to an electrical signal for use by the IC. When a tag is brought into the magnetic field produced by the reader, the recovered energy powers the IC, and an electromagnetic signal modulated with data in the memory is transmitted by the tag's antenna. The electromagnetic signal transmitted from the tag is recovered by an antenna within the reader, and converted back into an electrical form. The reader contains a sensitive receiving system that is designed to detect and process the weak tag signal, demodulating the original data stored in the tag memory.

As opposed to passive tags, active tags contain a miniature battery that provides the operating power for the IC. When interrogated by the reader, the IC broadcasts a signal that identifies itself to sensitive reader detection and data transmission circuits. This allows the tag to begin sending its data at a considerably greater distance from the reader than its passive counterpart. Additionally, an active tag uses battery energy to produce a much stronger electromagnetic response signal. All of this results in a significantly greater read range than a passive tag.

Many present and upcoming applications require the ability to automatically identify objects from a distance. RFID provides this requirement to some degree and has the benefit that line-of-sight between the reader and tag is not required. This is distinct from optical recognition techniques, such as barcode, that require the optical reader to be in line of sight from the identified object. Most optical reading techniques also require a directional decoding of the identifying code, giving rise to start and stop bits being part of the code. In a conventional, linear bar code, the order in which the bars appear is critical and changing the order results in a different code. The same is applicable also to RFID tags, where typically reflectors in the tag are used to modulate the RF signal, such that the presence or absence of reflectors affects the resulting code that is returned by the tag.

U.S. Pat. No. 5,381,137 ("RF tagging system and RF tags and method", assigned to Motorola, Inc., Schaumburg, Ill., published on 1995) discloses an RF tagging system that has a plurality of resonant circuits on a tag. When the tag enters a detection zone, the system determines the resonant frequency of each of the resonant circuits and produces a corresponding code. Resonant frequency detection is implemented by simultaneously radiating signals at each of the possible resonant frequencies for the tag circuits. The system is useful for coding any articles such as baggage or production inventory.

The reader in U.S. Pat. No. 5,381,137 comprises an antenna array having a plurality of fixed location multiple transmitter frequency probes. Tags comprise a plurality of passive resonant circuits, each of which may resonate at any different frequency selected from a predetermined plurality of known resonant frequencies. Each of the resonant circuits is fixed at a different location on a planar surface of the tag. The tag is positioned between guide rails so as to fix its position with respect to the plurality of fixed location probes. Either the tag is moved such that various rows of tuned circuits pass directly under the probes, or the probes are otherwise positioned directly above and in registration with the tuned circuits. By such means, each of the probes simultaneously radiates each of the possible resonant frequency signals which may correspond to the resonant frequency of any of the circuits.

Such a system is shown schematically in FIG. 1, showing a tag 10 that is encoded with multiple frequency sources to generate a code that is identified by a reader 11. Thus, as shown, the tag 10 comprises only three different frequency sources, depicted respectively $f_1$, $f_2$ and $f_3$. It is seen that each of these frequency sources may be used more than once, its presence in, or absence from, the tag being depicted by "Y" and "N", respectively. This does not cause any ambiguity since the frequency sources are spatially separated and the reader 11 is adapted to read each frequency source (which may be ambiguous) in association with its location (which is always unique). Thus, when a frequency source transmits a signal to the reader 11, this indicates that the frequency source is present at a known location, and the corresponding location in the resulting code construed by the reader may be set to logic "1" (or to logic "0" if negative logic is used). Since the location of each frequency source must be unique, the resulting code is likewise unique even if one or more of the transmitted frequencies is identical.

It is also known to use magnetic resonance (MR) for identification. Such is the case, for example, in the field of Magnetic Resonance Imaging (MRI) or Nuclear Magnetic Resonance spectroscopy (NMR spectroscopy). Furthermore, it is possible to identify multiple resonant frequencies detected in parallel. For example, according to U.S. Pat. No. 5,341,099 ("Magnetic resonance imaging apparatus", assigned to Kabushiki Kaisha Toshiba, published on 1994) data is produced from asymmetrical echo data, and an MR image is reconstructed from the data thus produced.

Non-resonant frequencies, such as acoustical signals, are also used in the art for encoding data. For example, U.S. Pat. No. 6,611,798 ("Perceptually improved encoding of acoustic signals", assigned to Telefonaktiebolaget LM Ericsson, published 2003) discloses encoding an acoustic source signal such that a signal reconstructed from the encoded information has a perceptually high sound quality. The acoustic source signal is encoded into at least one basic coded signal that represents perceptually significant characteristics of the acoustic signal. The encoder can include at least one spectral smoothing unit which receives at least one of the signal components on which the basic coded signal is based and generates in response thereto a corresponding smoothed signal component.

SUMMARY OF THE INVENTION

It is an object of the invention to provide an alternative encoding method and system in which no predetermined spatial relationship between reader and tag is required.

This object is realized in accordance with a broad aspect of the invention by a method for encoding a tag with an n-bit binary code (n>1), the method comprising:
(a) associating with the tag one or more predetermined frequency sources that produce known different respective characteristic frequencies; and
(b) associating with each of said characteristic frequencies a known unique position in the n-bit binary code.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 2:
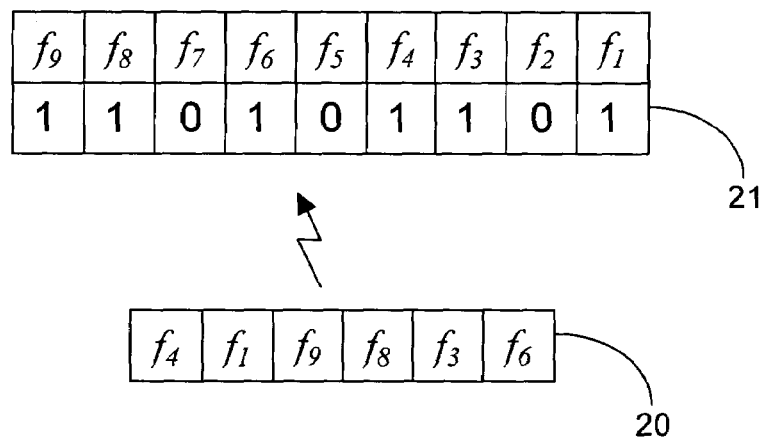
FIG. 2 shows schematically a tag according to the invention that is encoded with multiple frequency sources that are spatially unconstrained to generate a unique code.

Referring to FIG. 2 there is shown a tag 20 according to the invention that is encoded with multiple frequency sources to generate an n-bit code that is identified by a reader 21. By way of example only, the following description will relate to a 9-bit code, although the principles of the invention can readily be applied for any integer value of n greater than one.

Thus, for a 9-bit code the reader 21 pre-assigns 9 different frequencies designated $f_1, f_2 \ldots f_9$ to a unique respective position in the 9-bit code. Thus, the first frequency source $f_1$ is assigned to the least significant bit (LSB), while the frequency source $f_9$ is assigned to the most significant bit (MSB), each of the other seven bits of the 9-bit code being assigned to corresponding frequencies $f_2$ to $f_8$. The tag 20 is encoded by providing only those frequency sources that are reflected in the desired code. Thus, to encode 110101101 only the frequency sources $f_1, f_3, f_4, f_6, f_8$ and $f_9$ are required (assuming positive logic is used). It will be appreciated that negative logic could be employed instead, whereby the absence of a frequency gives rise to logic "1" at the corresponding location of the code.

Figure 1:
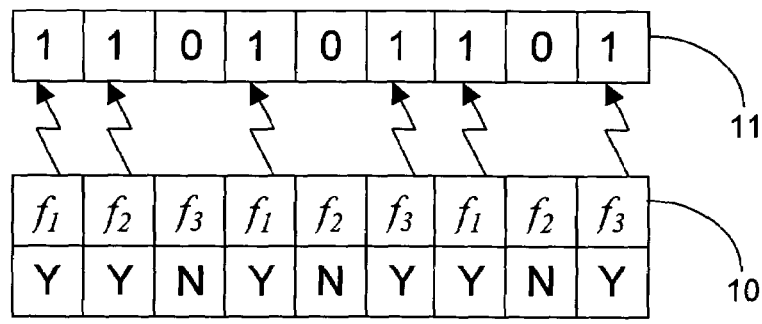
FIG. 1 shows schematically a prior art tag that is encoded with multiple frequency sources that are spatially constrained to generate a unique code.

In either case, the frequency sources $f_1, f_3, f_4, f_6, f_8$ and $f_9$ are spatially unconstrained. That is to say, neither the order in which they appear in the tag nor their relative spatial location is significant. Indeed, all the frequency sources could be spatially superimposed one on top of the other, so long as the reader is able to discern the presence of all those frequency sources that are present. It is thus seen that, unlike the prior art system depicted in FIG. 1, in the invention a unique code is obtained merely by encoding the tag with a plurality of predefined frequency sources that produce known different respective characteristic frequencies, each of which is associated with a known unique position in the n-bit binary code.

Frequency sources may be used more than once, although multiple instances of the same frequency source have no significance since the same characteristic frequency is detected by the reader and affects only a single bit of the n-bit code.

It should be noted that the frequency sources composing a tag are not necessarily dispersed within a volume. Very small frequency sources can be, for example, mixed in ink and printed on the identified object, such as printing on paper. According to a different example, by mixing the frequency sources with pigments used to color fabrics it is possible to print a hidden tag on fabric (if the pigment used has the same color as the fabric). It should be noted that any number of frequency sources may be printed in this manner.

Likewise, a dispersion or colloid can be formed of different frequency sources, such as ferromagnetic elements and the resulting dispersion or colloid then serves as a tag that encodes a unique code depending on which frequency sources are present.

It should also be noted that the characteristic frequencies of the frequency sources need not be resonant or even particularly sharp. Thus, each frequency may be realized by a frequency band provided that the range of frequencies within each band can be distinguished from those of an adjacent frequency band even if not from each other, thus allowing each frequency band to be unambiguously detected. In this case, a series of band-pass filters may be used so as to pass all frequencies in a given band, while blocking all other frequencies, thereby allowing each frequency band to be unambiguously detected.

Figure 3:
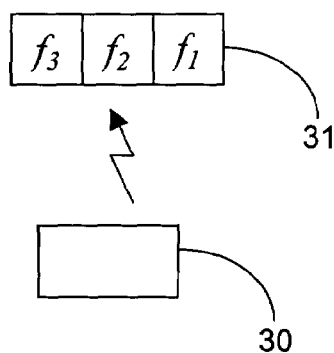
FIG. 3 is a schematic representation of a tag-reader combination configured to encode a 3-bit code.

FIG. 3 is a schematic representation of a tag 30 and a reader 31 that are combined to encode and decode a 3-bit code that is characterized by the presence or absence of three different frequency sources denoted $f_1, f_2$ and $f_3$, which encode respectively the LSB, the second bit and the MSB. The reader 31 detects characteristic frequencies emitted by the tag 30 and compiles a 3-bit code according to the following logic.

If all three frequency sources are absent from the tag, the combination generated is 000;

If $f_1$ exists, and the other two frequency sources are absent, the combination generated is 001;

If $f_2$ exists, and the other two frequency sources are absent, the combination generated is 010;

If $f_1$ and $f_2$ exist, while $f_3$ is absent, the combination generated is 011;

If $f_3$ exists, and the other two frequency sources are absent, the combination generated is 100;

If $f_1$ and $f_3$ exist, while $f_2$ is absent, the combination generated is 101;

If $f_2$ and $f_3$ exist, while $f_1$ is absent, the combination generated is 110;

When all three frequency sources exist in the tag, the combination generated is 111.

From the foregoing, it will be appreciated that the received frequencies serve to identify the tag with which it is associated. The corollary is also true in that on decoding an n-bit binary string corresponding to a tag, it is possible to infer if a certain frequency source is associated with the tag or not. Thus, if in an n-bit binary string according to the example the third bit from the left is 1, this means that the string encodes a tag with which the frequency source $f_3$ is associated.

When it is desired to increase the number of possible codes that can be encoded with the tag, one or more new bits must be allocated and this implies providing one or more new frequency sources each having a respective unique characteristic resonant frequency and assigning each of the new frequency sources to known unique positions in the binary string. For example, to expand the 3-bit code described above with reference to FIG. 3 of the drawings to a 4-bit code, the MSB of the 4-bit code is associated with an additional, fourth frequency source $f_4$.

In general, to introduce a frequency source $f_n$, there should be allocated a bit representing $f_n$'s existence or absence to a known unique position in the n-bit code.

Figure 4:
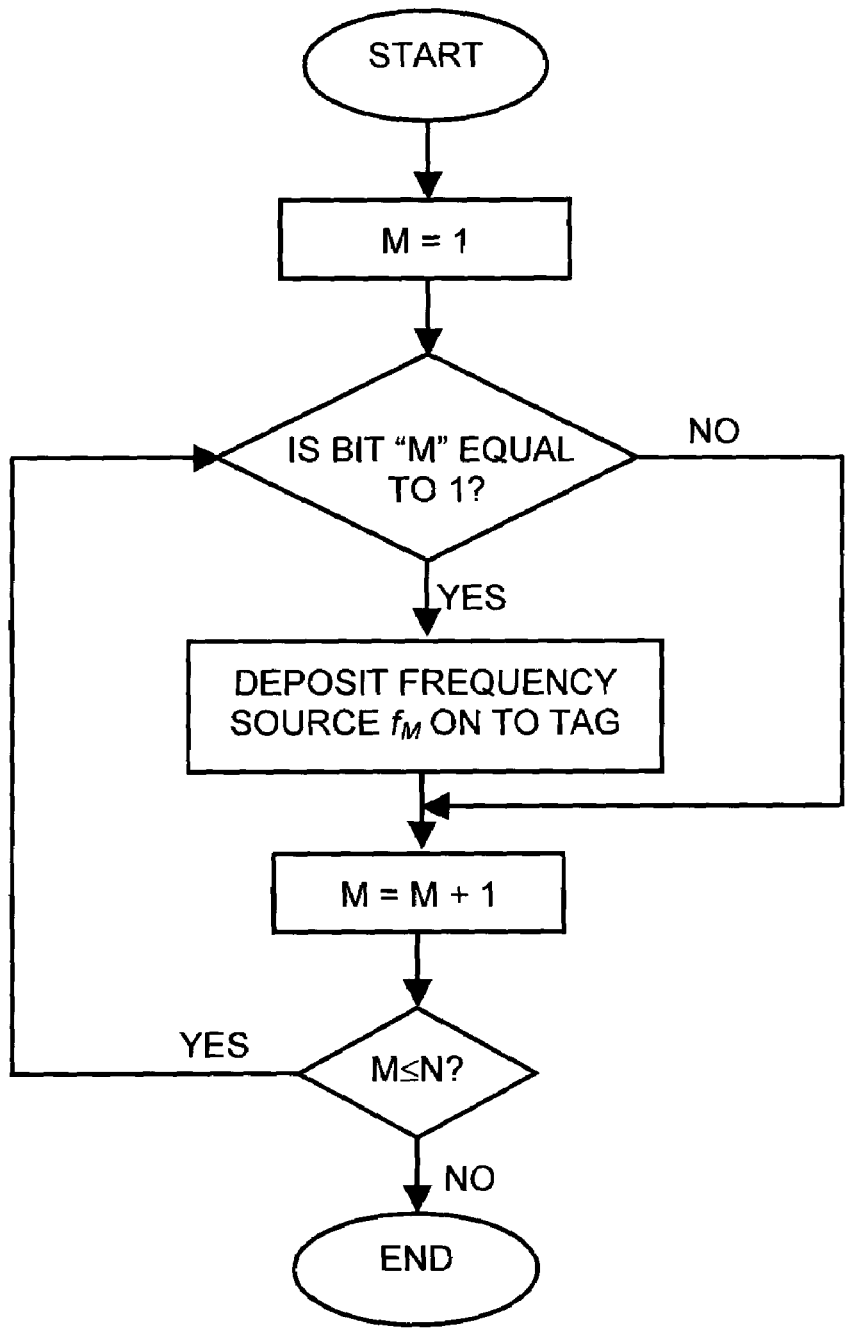
FIG. 4 is a flow chart showing the principal operations carried out by an encoder according to the invention.

FIG. 4 is a flow chart showing the principal operations carried out by an encoder according to the invention. Each bit is encoded successively starting with the LSB corresponding to M=1. If the corresponding bit is to be set to 1, then the frequency source corresponding to this bit is deposited on the tag. The value of M is then incremented and the process repeated in respect of successive bits in the n-bit code.

Figure 5:
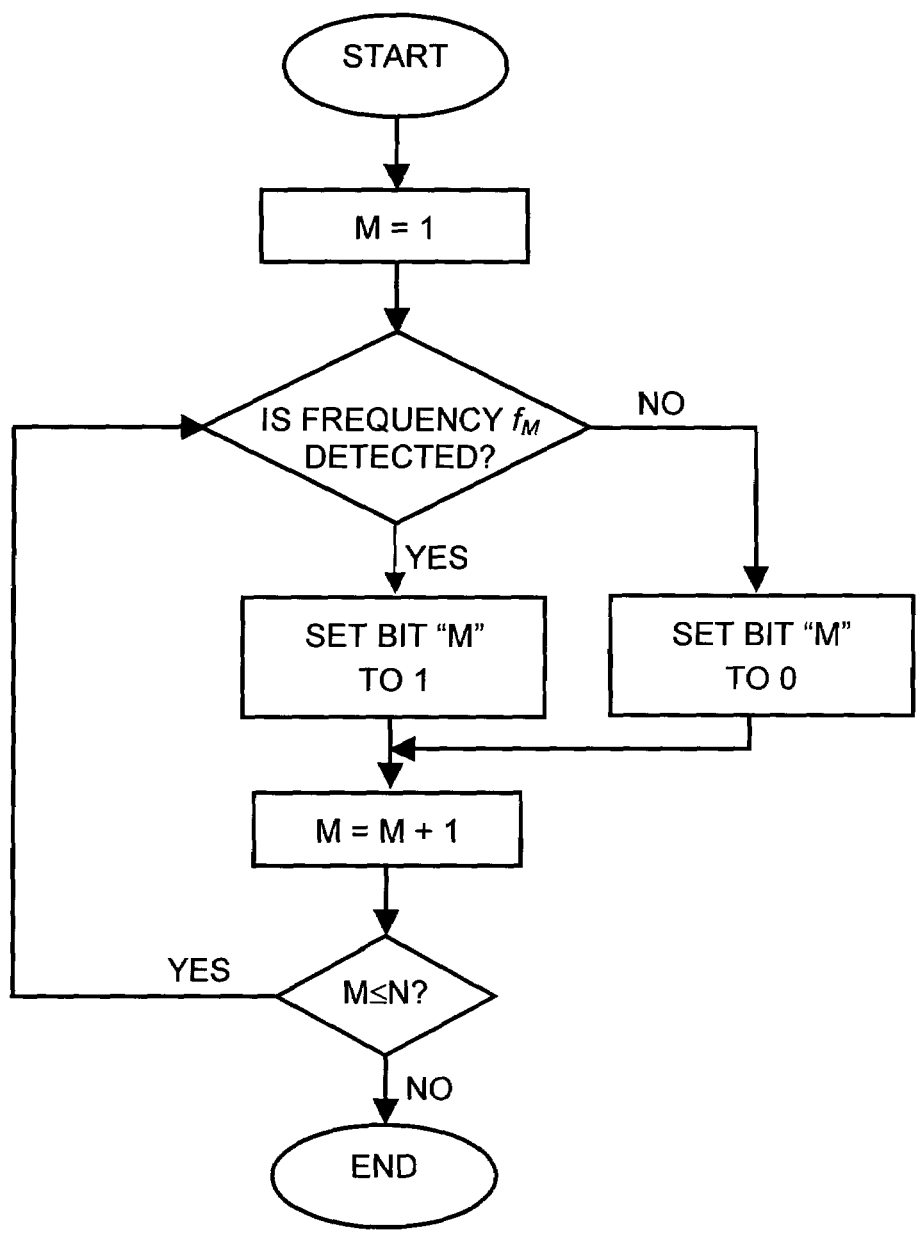
FIG. 5 is a flow chart showing the principal operations carried out by a decoder according to the invention.

FIG. 5 is a flow chart showing the principal operations carried out by a decoder according to the invention. Each bit is decoded successively starting with the LSB corresponding to M=1. If the frequency corresponding to each bit is detected, then the corresponding bit is set to 1. The value of M is then incremented and the process repeated in respect of successive bits in the n-bit code. It should be noted that any number of frequency sources may be decoded in this manner.

It should be noted that the flow charts illustrated in FIGS. 4 and 5 represent non-limiting exemplary ways of encoding and decoding an n-bit code and variations will be apparent to those of average skill in the art. It will also be appreciated that the manner in which the decoder detects the frequency sources deposited on the tag does not affect the manner in which the n-bit code is decoded. Thus, the decoder can be configured to selectively receive each characteristic frequency sequentially and to assign a corresponding value to the bit associated therewith. Alternatively, it may be configured to receive all the characteristic frequencies in parallel as a complex signal and to perform frequency separation on the complex signal received from the reader. In this case, the separated frequencies emitted by the tag are recorded so as to compile a list of all unique characteristic frequencies associated with the tag. Subsequent decoding may then continue as for sequential decoding. An example of an applicable frequency separation technique is described in above-mentioned U.S. Pat. No. 5,341,099.

It should further be noted that in the embodiments described so far, frequency sources ($f_1, f_2, \ldots, f_n$) are associated with the tag to compose the n-bit binary tag, and the reader 204 detects the corresponding characteristic resonant frequencies generated by the frequency sources. The frequency sources used can be active frequency sources. An active frequency source can be, for example, a resonant circuit such as the circuit used in RFID, activated by a battery for example. However, passive frequency sources may also be used.

An example of a passive frequency source is a resonant circuit activated by energy transmitted to it by the reader. Such resonant circuits are well known in smart card technology and are described, for example, in U.S. Pat. No. 5,241,160 issued Aug. 31, 1993 entitled "A System and Method for the Non-Contact Transmission of Data" and assigned to On Track Innovations Ltd. Another approach is to use resonant elements, in a way known to those versed in fields like Nuclear Magnetic Resonance (NMR) spectroscopy or Magnetic Resonance Imaging (MRI).

Resonant elements such as ferromagnetic elements have characteristic resonant frequencies, induced by exposing the resonant element to a predetermined excitation frequency. Therefore, a resonant element can be used as a passive frequency source in tags according to the invention. It should be noted that resonant elements can be of any physical state, such as liquid, gas or solid.

Those versed in the art will appreciate that the term "characteristic frequencies" as used above can apply to any frequency range within the electro-magnetic spectrum, so long as they are capable of being uniquely detected by the reader. For example, acoustic signals can be used too, or even a combination of different ranges. A tag conveying characteristic frequencies of any range can be encoded according to the invention by n-bit binary codes, as long as the characteristic frequencies are unique (forming, therefore, unique characteristic frequencies), are associated with known unique positions in the n-bit binary code and can be uniquely detected.

Tags that can be encoded by n-bit binary codes according to the described embodiments can be utilized in many applications such as for automatic identification of objects. For example, in a clothing store it is possible to mark each product with a tag including a unique combination of frequency sources, identifying the products thereby. If there are two identical shirts in the store, for example, each of them can receive a unique tag. Because the encoding method enables $2^n$ different n-bit binary codes, this means that with 30 different frequency sources, for example, it is possible to have more than ten million different tags, which is enough to uniquely tag every product in an average store. Larger numbers of frequency sources enable even much higher number of identifying tags, of course.

Figure 6:
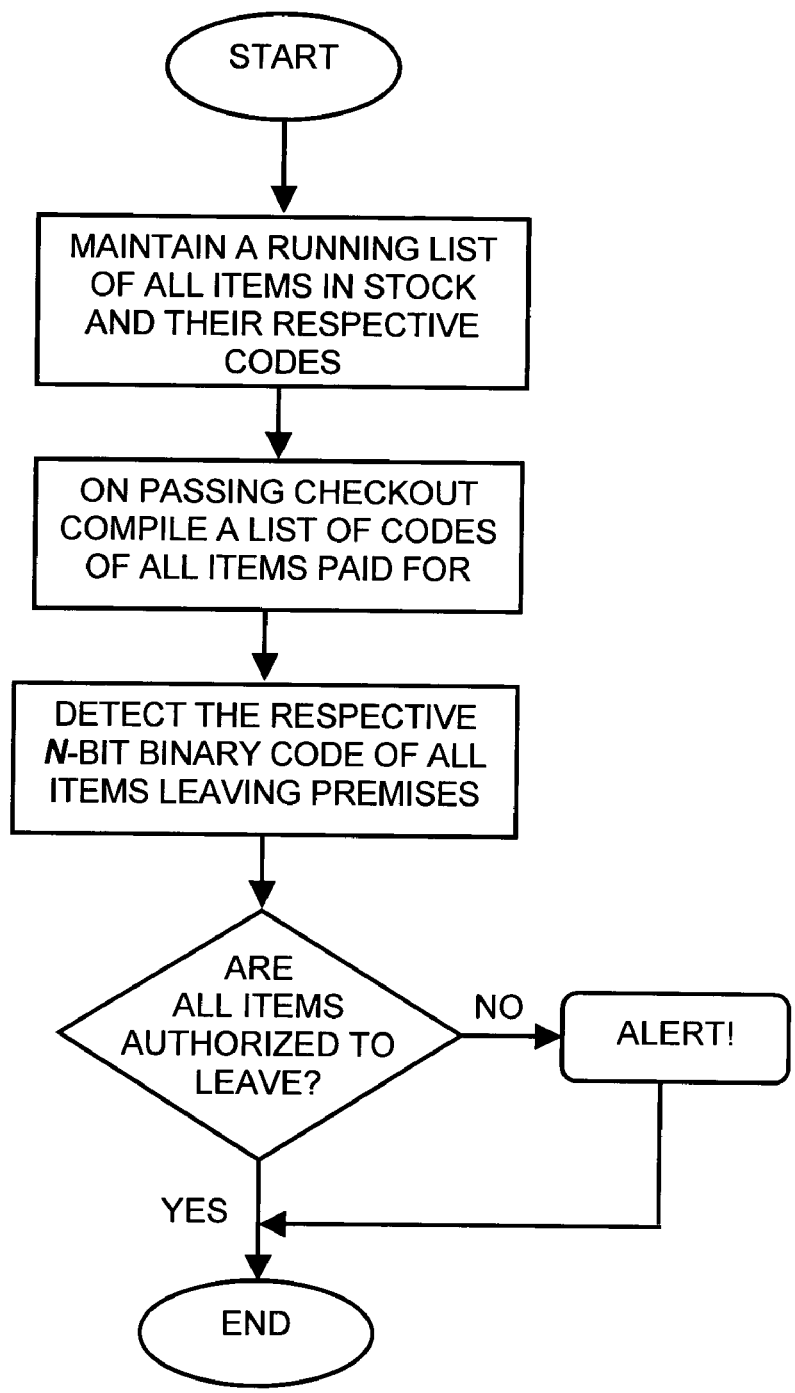
FIG. 6 is a flow chart showing the principal operations carried out by a stock management system according to the invention.

FIG. 6 is a flow chart showing the principal operations carried out by a decoder according to such an embodiment when used in an anti-shoplifting system, for alerting suspected theft, where products are uniquely encoded using tags. If the tags include passive frequency sources, the anti-shoplifting system should include a transmitter that induces the predetermined excitation frequencies, and a reader 204, that detects the characteristic resonant frequencies emitted by the tags. When the tags are placed in the zone susceptible to the transmitter, they convey the resonant frequency, which is then detected by the reader. The reader (or a processor coupled thereto) then decodes the tag so as to generate a corresponding n-bit binary code.

Alternatively, the tags can include active frequency sources that do not require a transmitter in order to convey their characteristic resonant frequencies.

Each product in the store carries a unique tag bearing a respective n-bit binary code whereby it is possible to identify the product type, and even the unique item. Therefore, purchasing a certain item, it is possible to decode the item's tag, generating its n-bit binary code. The n-bit binary code can be added to a list of items authorized to leave the premises of the store.

In all exits of the premises frequency readers are positioned in a way that the exit forms at least part of the zone of the reader. That way the readers can decode tags passing in their zone. If the decoded n-bit binary string cannot be located in the list of items authorized to leave the premises, this is considered as a suspected theft.

It should be noted that this example is non-limiting, and other embodiments will be readily apparent to those versed in the art. For example, instead of having a list of items that are authorized to leave the premises, it is possible to compile a list of all the items in the premises, removing the item from the list when authorizing to take it out (i.e. on receiving payment at the checkout). On exiting the premises the contents of the user's shopping basket are decoded, and if a code obtained therefrom corresponds to an article in the list of items, this raises a suspicion that the article is unauthorized to leave the place. Yet another approach is to shield a valid tag so that its resonating frequencies cannot be detected by the readers at the exit.

In connection with the example above, it will be appreciated that associating such tags with items in a store or a library, for example, allows use of the tags for automatic checkout, or for stock management.

Figure 7:
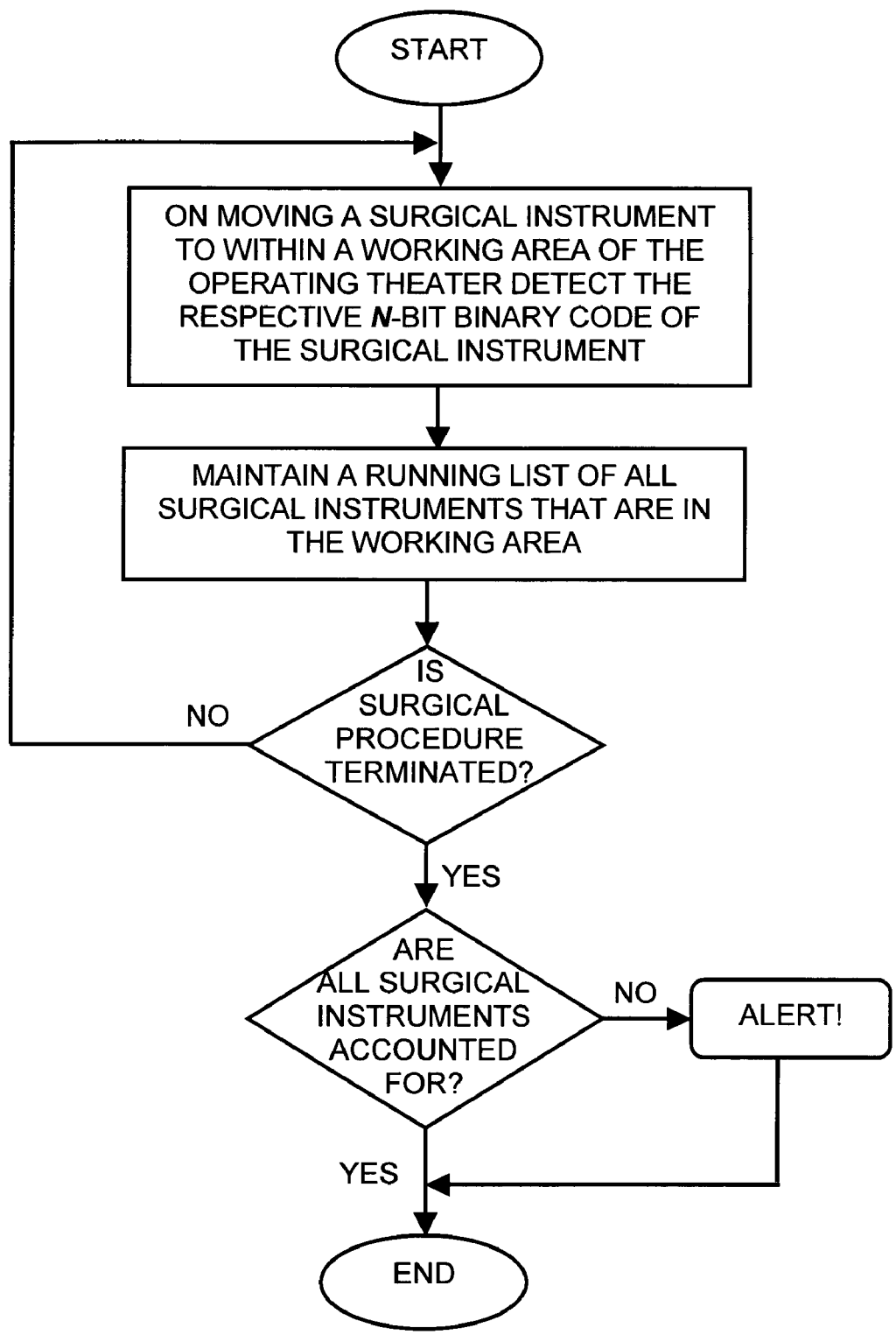
FIG. 7 is a flow chart showing the principal operations carried out by a surgical instrument tracking system according to the invention.

FIG. 7 is a flow chart showing the principal operations carried out by a decoder according to another embodiment for keeping track of surgical instruments during medical procedures for improving safety in an operating theater. It is a known problem that in operating theaters surgical instruments and materials, such as gauze pads, forceps or scalpels, are sometimes left in the patient's body, causing considerable damage to the patient. One way to overcome the risk is having a staff person count the instruments before the doctor begins sewing, making sure everything is accounted for. This procedure is liable to error and can be automated by uniquely marking each item with a tag according to the invention. On moving a surgical instrument to within a working area of the operating theatre the n-bit binary code of every surgical instrument can be decoded and listed in a running list of all the surgical instruments that are in the working area. When leaving the working area, surgical instruments' n-bit binary codes are removed from the running list. Upon termination of the surgical procedure the list is checked, ensuring that all surgical instruments are accounted for.

Items can also be pre-encoded. For example, it is possible to print a tag according to the invention on each gauze pad. It is known that frequently several gauze pads are packed together in one pack. When packing the gauze pads it is possible to manage a list of n-bit binary codes associated with the packed gauze pads. The list itself can be identified by a unique n-bit binary code encoding a tag that can be printed, for example, on the package.

When a package marked with a tag is moved into the working area, its code is detected, inserting all the codes of the included gauze pads into the running list of all surgical instruments that are in the working area. At the same time it is possible to install a frequency reader near a trash bin, in a way that the trash bin is in the zone of the reader. Whenever a gauze pad is disposed of in the trash bin, its n-bit binary code is removed from the running list.

Figure 8:
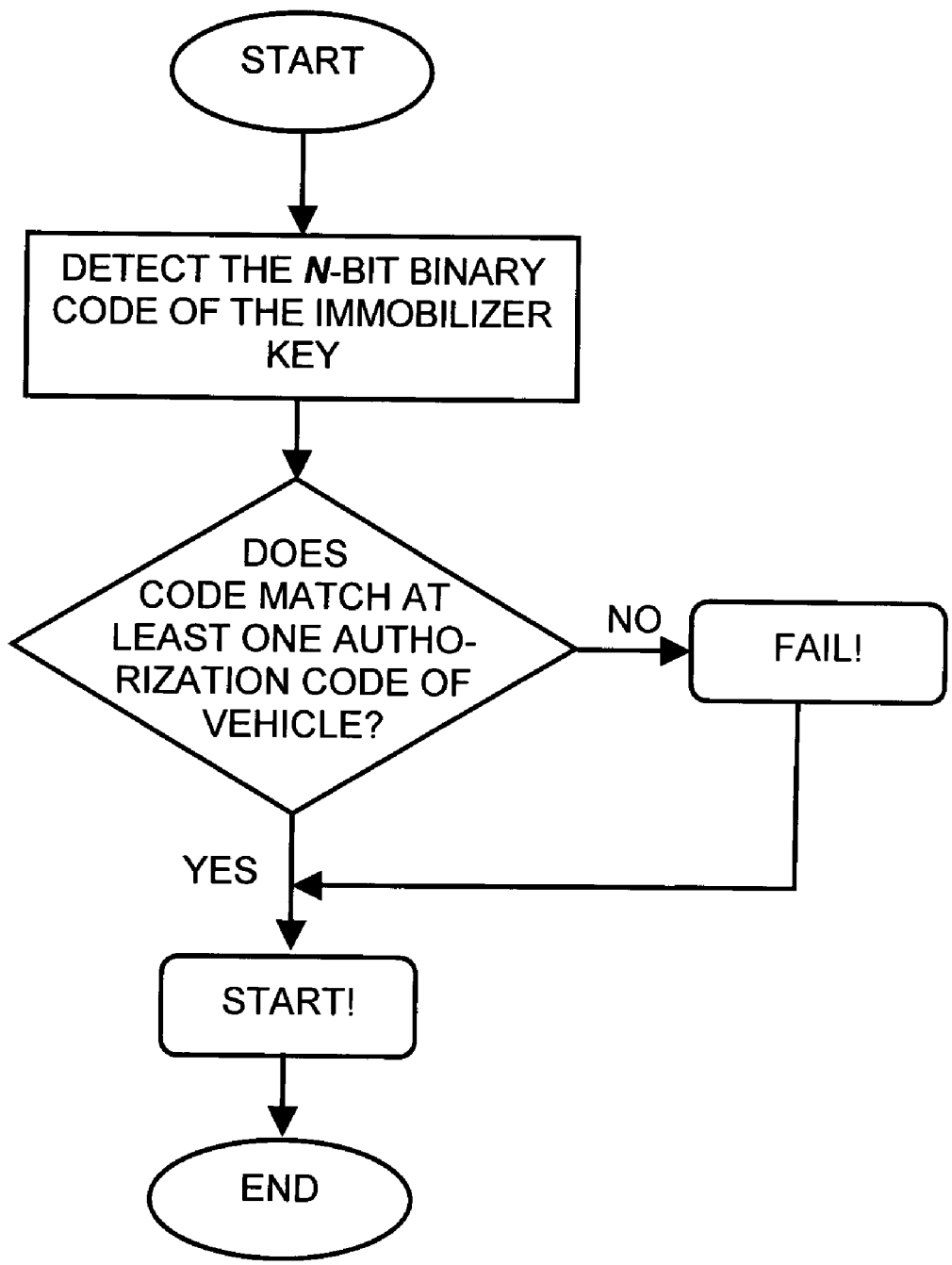
FIG. 8 is a flow chart showing the principal operations carried out by a authorization system according to the invention.

FIG. 8 is a flow chart showing the principal operations carried out by a decoder according to yet another embodiment for conditionally enabling and disabling electrical appliances. In vehicles, for example, immobilizers are commonly used to disable ignition without a predefined key. Tags according to the invention can be used as such predefined keys. A reader in the vehicle is programmed to recognize one or more n-bit binary codes. An authorized driver should carry a corresponding tag associated with one or more predetermined frequency sources that produce known different respective characteristic frequencies and each of which is associated with a known unique position in an n-bit binary code. When the tag is brought to the vicinity of the decoder, it is decoded to provide the corresponding n-bit binary code. The immobilizer then determines whether the detected n-bit binary code corresponds to any of the recognized n-bit binary codes, and if so, allows ignition of the vehicle's engine, which otherwise remains immobilized.

Furthermore, in a company having a fleet of vehicles, for example, the IDs of all employees who are authorized to drive the company's vehicles can be used as n-bit binary codes programmed into the readers of all the company's vehicles, thus ensuring that only authorized employees can drive them. It is also possible to compile a list monitoring parameters associated with employee use of the company's vehicle. For example, such a list enables management to track the identity of each employee driving a vehicle, the date when the vehicle was used, the distance driven, and so on.

Figure 9:
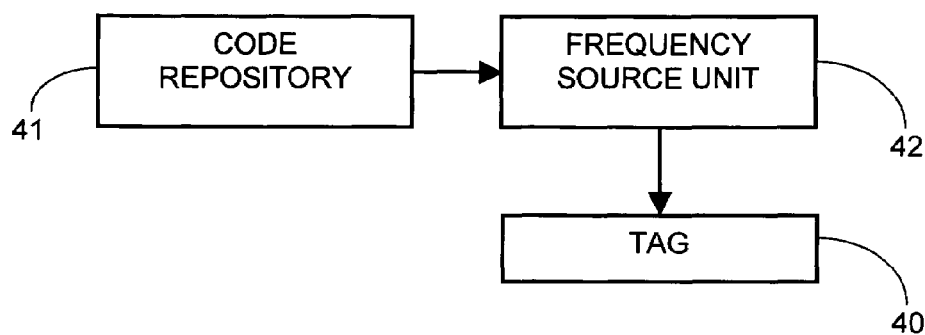
FIG. 9 is a block diagram showing functionally an encoder according to the invention.

FIG. 9 is a block diagram showing functionally an encoder for encoding a tag 40 with an n-bit binary code stored in a code repository 41. A frequency source unit 42 is coupled to the code repository 41 and is responsive to an n-bit binary code stored therein for depositing in association with the tag 40 one or more predetermined frequency sources that produce known different respective characteristic frequencies and that are associated with a known unique position in the n-bit binary code.

Figure 10:
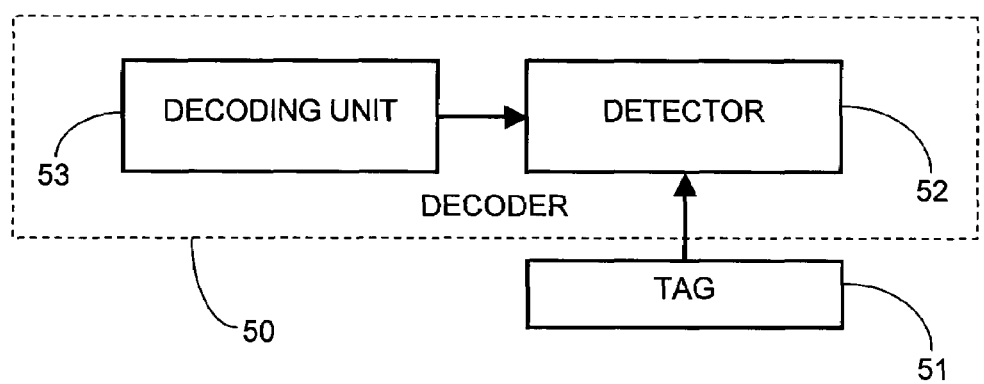
FIG. 10 is a block diagram showing functionally a decoder according to the invention.

FIG. 10 is a block diagram showing functionally a decoder 50 for decoding a tag 51 having an n-bit binary code. The decoder comprises a detector 52 for detecting one or more different characteristic frequencies each of which is associated with a known unique position in the n-bit binary code. Coupled to the detector 52 is a decoding unit 53 that substitutes at respective positions of the n-bit binary string respective binary values according to a presence or absence of the respective characteristic frequency associated with the respective position in the n-bit binary code.

The invention claimed is:

1. A method for encoding a tag with an n-bit binary code (n>1) the method comprising:
    (a) associating with the tag one or more predetermined frequency sources that produce known different respective characteristic frequencies the one or more predetermined frequency sources being other, than an integrated circuit; and
    (b) associating with each of said characteristic. frequencies a known unique position in the n-bit binary code.

2. The method of claim 1, wherein associating with the tag one or more predetermined frequency sources includes associating with the tag at least one passive frequency source.

3. The method of claim 1, wherein associating with the tag one or more predetermined frequency sources includes associating at least one resonant element with the tag.

4. The method of claim 1, wherein the characteristic frequencies are resonant frequencies.

5. The method of claim 1, wherein the characteristic frequencies constitute acoustic signals.

6. The method of claim 1, wherein associating with the tag one or more predetermined frequency sources includes associating with the tag at least one spatially unconstrained predetermined frequency source.

7. A tag encoded with one or more predetermined frequency sources that produce known different respective characteristic frequencies and that are associated with a known unique position in an n-bit binary code (n>1), wherein the one or more predetermined frequency sources is other than an integrated circuit.

8. The tag of claim 7, wherein the one or more predetermined frequency sources are spatially unconstrained.

9. The tag of claim 8, wherein at least one of the frequency sources is a passive frequency source.

10. The tag of claim 8, wherein the one or more predetermined frequency sources is a resonant element.

11. The tag of claim 8, wherein the characteristic frequencies are resonant frequencies.

12. An encoder for encoding a tag with an n-bit binary code (n>1), said encoder comprising:
a frequency source unit that is responsive to the n-bit binary code for depositing in association with the tag one or more predetermined frequency sources that produce known different respective characteristic frequencies and that are associated with a known unique position in the n-bit binary code, wherein the one or more predetermined frequency sources is other than an integrated circuit.

13. The encoder of claim 12, wherein the one or more predetermined frequency sources are spatially unconstrained predetermined frequency sources.

14. A method for encoding a tag with an n-bit binary code, the method comprising:
(a) printing on or in association with the tag one or more predetermined frequency sources that produce known different respective characteristic frequencies, wherein the one or more predetermined frequency sources is other than an integrated circuit; and
(b) associating with each of said characteristic frequencies a known unique position in the n-bit binary code.

15. The method of claim 14, wherein associating with the tag one or more predetermined frequency sources includes associating with the tag at least one passive frequency source.

16. The method of claim 14, wherein associating with the tag one or more predetermined frequency sources includes associating at least one resonant element with the tag.

17. The method of claim 14, wherein at least some of the characteristic frequencies are resonant frequencies.

18. The method of claim 14, wherein at least some of the characteristic frequencies constitute acoustic signals.

19. A tag encoded with one or more predetermined frequency sources that are printed on or in association with the tag and that produce known different respective characteristic frequencies that are associated with a known unique position in an n-bit binary code, the one or more predetermined frequency sources is other than an integrated circuit.

20. The tag of claim 19, wherein at least one of the frequency sources is a passive frequency source.

21. The tag of claim 19, wherein at least one of the frequency sources is a resonant element.

22. The tag of claim 19, wherein the characteristic frequencies are resonant frequencies.

23. The tag of claim 19, wherein the characteristic frequencies constitute acoustic signals.

24. A method for processing a tag associated with an n-bit binary code (n>1), the method comprising:
encoding the tag with the n-bit binary code, including:
(a) associating with the tag one or more predetermined frequency sources that produce known different respective characteristic frequencies;
(b) associating with each of said characteristic frequencies a known unique position in the n-bit binary code; and
decoding the tag, including:
(c) detecting the characteristic frequencies emitted by the tag;
(d) substituting at respective positions of said n-bit binary code respective binary values according to a presence or absence of the respective characteristic frequency associated with the respective position in the n-bit binary code.

25. A system for processing a tag associated with an n-bit binary code (n>1), the system comprising:
an encoder for encoding the tag with the n-bit binary code, the encoder including:
a frequency source unit that is responsive to the n-bit binary code for depositing in association with the tag one or more predetermined frequency sources that produce known different respective characteristic frequencies and that are associated with a known unique position in the n-bit binary code; and
a decoder for decoding the tag, the decoder including:
a decoding unit responsive to one or more different characteristic frequencies each of which is associated with a known unique position in the n-bit binary code and for substituting at respective positions of said n-bit binary code respective binary values according to a presence or absence of the respective characteristic frequency associated with the respective position in the n-bit binary code.

* * * * *